EXAMINER

Oct. 4, 1966 W. B. JENSEN ETAL 3,277,303

COMBINED BINOCULAR AND OPTICAL COMMUNICATION DEVICE

Filed Feb. 1, 1966 2 Sheets-Sheet 1

INVENTORS.
WAYNE B. JENSEN,
EDWARD H. RITTER,

By [signature] ATTORNEY.
[signature] AGENT.

COMBINED BINOCULAR AND OPTICAL COMMUNICATION DEVICE

Filed Feb. 1, 1966 2 Sheets-Sheet 2

INVENTORS.
WAYNE B. JENSEN,
EDWARD H. RITTER,
By [signature] ATTORNEY.
[signature] AGENT.

United States Patent Office 3,277,303

Patented Oct. 4, 1966

3,277,303

COMBINED BINOCULAR AND OPTICAL COMMUNICATION DEVICE

Wayne B. Jensen and Edward H. Ritter, Claremont, Calif., assignors to General Dynamics Corporation, a corporation of Delaware Filed Feb. 1, 1966, Ser. No. 524,353
10 Claims. (Cl. 250—199)

This invention relates to communication systems, particularly to a communication system utilizing light as the conducting and transmission medium, and more particularly to a communication system which combines the seeability of field glasses with the talkability of voice transmission by a battery powered infrared beam.

The art of communication by light is old. There have been numerous systems developed for various applications, and much effort has been directed toward modulating and detecting elements. Prior art attempts, similar to the general arrangement of the present system, have been directed toward compactness of the transmitter and receiver optical units and their controls which facilitate the aligning of two units with one another for operation. U.S. Patent 2,494,645 is exemplary of this latter mentioned prior art system.

The present invention provides a secure line-of-sight method of voice communication. A binocular communication instrument is visually aimed by an operator at another operator with a similar unit. An infrared generating device, modulated by audio frequencies has its output superimposed into the optical path of one half of the binocular. The remaining half of the binocular has an infrared detector superimposed on its optical path for reception of modulated infrared from the other instrument.

Therefore, it is an object of this invention to provide a communication system.

A further object of the invention is to provide a communication system between two distant points by means of modulated light.

A still further object of the invention is to provide a communication system which permits a secure line-of-sight method of voice communication.

Another object of the invention is to provide a communication system which combines the seeability of field glasses with the talkability of voice transmission by a battery powered infrared beam.

Another object of the invention is to provide a communication system which incorporates a pair of binocular instruments wherein one half of each instrument functions as a transmitting unit and the other half as a receiving unit while providing an unobstructed visual field of view.

Other objects of the invention will become readily apparent from the following description read in conjunction with the accompanying drawings wherein.

Broadly, the invention is directed to an infrared communication system characterized by transmitting and receiving units which are operationally combined with a conventional set of binoculars. The IR transmitting and receiving units are integrally combined with the binoculars and respectively arranged for cooperative association with an individual one of the binocular eyepieces, dichroic filters being employed in each of the eyepieces in a manner such that visual and infrared radiation entering or leaving each eyepiece is split or blocked out as necessary with the visual portion being conveyed to the eyes of the observer and the infrared portion being conveyed to the IR detector or transmitted as the case may be. In addition, each unit includes a press-to-talk-and-listen button which allows the operator to talk or listen while holding the button down.

Figures 1, 2:
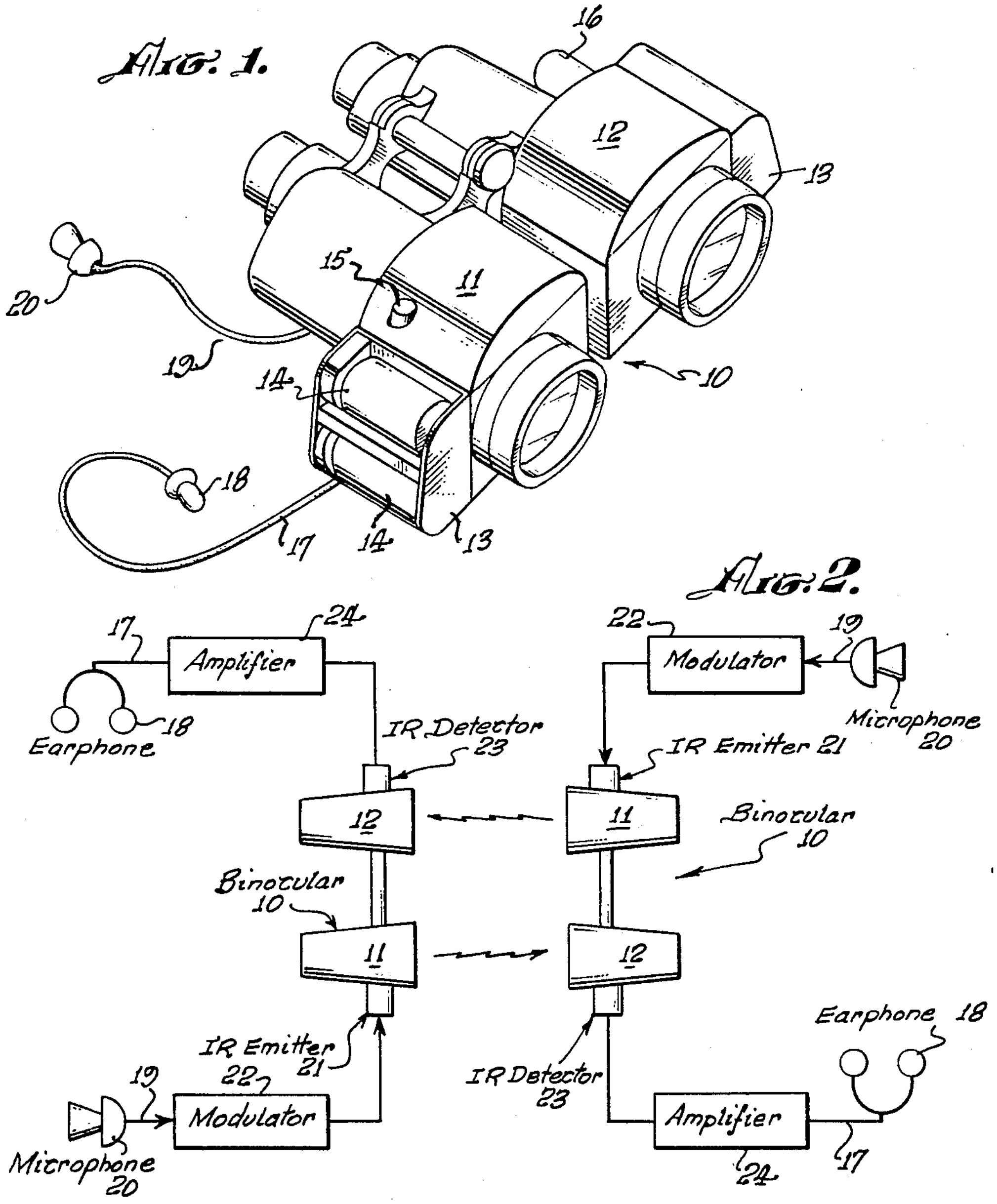
FIG. 1 is a perspective view of an embodiment of an instrument of the inventive system with portions removed to show a portion of the power package.
FIG. 2 is a schematic view illustrating the inventive system.

Referring now to the drawings, FIG. 1 shows a binocular communicator unit incorporating the invention, generally indicated at 10, and comprising a pair of barrels 11 and 12, in which the eyepiece lens and objectives are mounted. Barrels 11 and 12 are pivotally interconnected in conventional manner for adjustment to the operator's eyes. Mounted on each of barrels 11 and 12 are housings 13, each housing containing a pair of batteries or cells 14 (only one pair being shown), which may be of the nickel-cadmium rechargeable type. Batteries 14 provide the unit 10 with the capability of about four hours of continuous transmission and about forty hours of voice reception. Operatively mounted on barrel 11 is a push-to-talk-and-listen button 15, while a gain adjustment knob 16, which incorporates an on-off switch, is operatively mounted on barrel 12. The operation of elements 15 and 16 will be described hereinafter. Extending from barrel 12 of unit 10 is a stiff but flexible conductor cable 17 having an electroacoustic transducer such as an earphone or loudspeaker 18 mounted at the end thereof, while another stiff but flexible conductor cable 19 having an electroacoustic transducer such as microphone 20 mounted at the end thereof extends from barrel 11.

The inventive system as schematically shown in FIG. 2 comprises a pair of binocular communicator units 10 wherein the units are visually aimed at one another, whereby the transmitter section or barrel 11 of one unit communicates with receiver section or barrel 12 of the other unit, thereby confining transmission to a very narrow beam and thus provide a far more secure type of communication between the operators of the units 10.

The transmitter section or barrel 11 of unit 10 generally comprises an infrared (IR) emitter or generating device 21 such as a gallium- arsenide IR diode, for example, modulated by audio frequencies; i.e., the operator's voice via microphone 20 and modulator 22, has its output superimposed into the optical path of that half (barrel 11) of the binocular unit. The remaining half (receiver section or barrel 12) of binocular unit 10 has an IR detector 23 superimposed on its optical path for reception, via amplifier 24 and earphone 18, of modulated IR from the other unit or instrument 10. Thus, with each unit 10 constructed in this manner two-way, line-of-sight, interference-free voice communication can be effectively provided for a distance of at least 4,000 feet.

Figure 3:
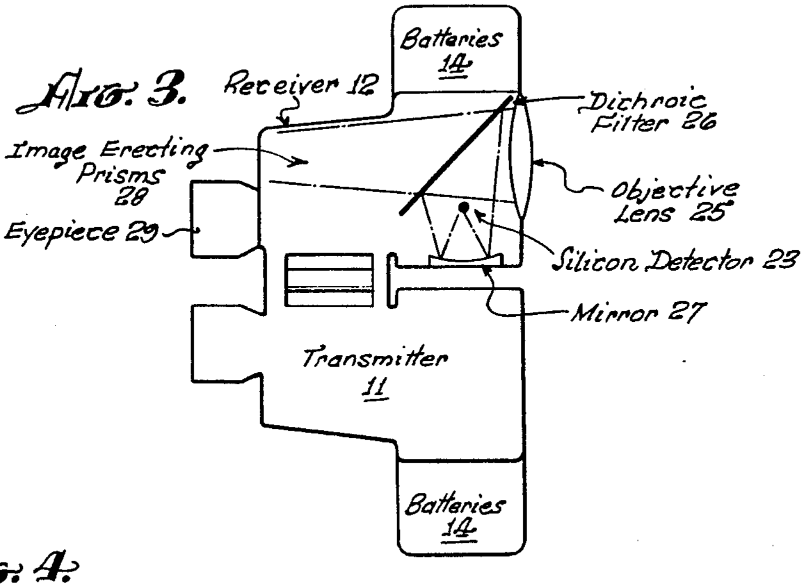
FIG. 3 is a partial schematic plan view of the FIG. 1 instrument illustrating the optical arrangement thereof.

The optical arrangement of the receiver section or barrel 12, for example, is shown in FIG. 3. Generally the optics comprise an objective lens 25, dichroic filter 26, concave mirror 27, IR detector 23, image erecting prisms indicated at 28, and eyepiece 29. The detector 23 may be a silicon photovoltaic diode, for example. The IR radiation is superimposed into the optical path by the use of dichroic filter 26 designed to reflect the IR signal or spectrum onto mirror 27 and pass the visual signal or spectrum to the image erecting prisms 28.

The filter 26 is of a conventional type and consists of a flat piece of glass having many thin-film layers of suitable material deposited upon its surface. The plane of filter 26 is mounted at a 45° angle relative to the optical axis between the objective lens 25 and the eyepiece lens 29. In this position, the filter 26 acts as a mirror to IR and as a window to visual light. To minimize losses of the radiation through glass, the filter is located between the objective lens 25 and the erecting prisms 28. The focal point of the reflected IR is an inconveniently long distance from the normal optical axis, so the concave mirror 27 is used to fold the IR beam back and shorten the effective focal length of the IR optics for packaging convenience.

At the focal point of the IR optics of each unit 10 are located either IR diode 21 for transmitting in barrel 11, or the IR detector 23 for receiving in barrel 12, the beam being folded by the mirror 27 in each barrel due to the location of the focal point in this embodiment.

Figure 4:
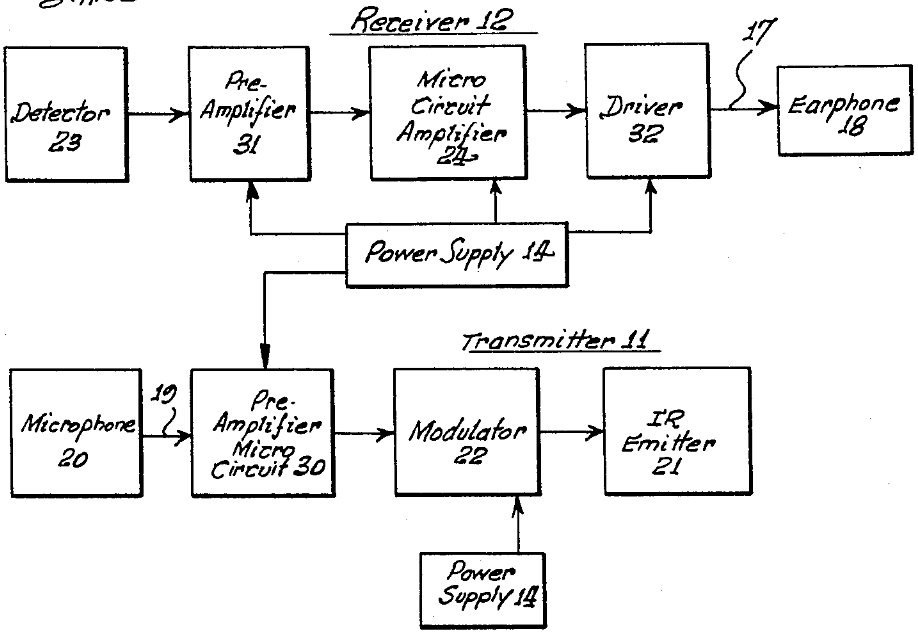
FIG. 4 is a block diagram of the electronics of the FIG. 1 instrument.

The electronic block diagram for each of the binocular communicator units 10 is shown in FIG. 4. The electronics of the IR transmitter contained in barrel 11 consists of the IR emitter or diode 21 driven by the modulator 22 which is in turn preceded by a preamplifier 30 and the microphone 20. The transmitter 11 is powered by the power supply or batteries 14. The electronics of the IR receiver contained in barrel 12 consists of the IR detector 23 driving amplifier 24 through a pre-amplifier 31 which in turn powers the earphone or loudspeaker 18 through a driver 32. The receiver 12 is powered by the power supply or batteries 14. The position of the detector 23 is such that it senses IR radiation centered around the visual optical axis. The field is kept smaller than the visual field in order to improve the signal to noise ratio.

It is thus seen that this invention provides a secure line-of-sight method for voice communication using a modulated infrared beam. In operation with the earphone 18 and microphone 20 in position, the instruments 10 are visually aimed by operators at one another, the push-to-talk-and-listen button 15 is depressed thereby allowing each operator to listen or talk without releasing the button, thus increasing the effectiveness of the system. While an operator's finger of one hand is holding the button 15 down, a finger of the other hand can readily operate the gain adjustment knob 16 which contains the on-off switch, thereby allowing a two way conversation to take place for a distance of at least 4,000 feet. Since the transmission is confined to a very narrow beam, the communication is relatively secure from outside pickup or interference.

Although a specific embodiment of the invention has been illustrated and described, modifications and changes will become apparent to those skilled in the art, and it is intended to cover in the appended claims all such modifications and changes as come within the true spirit and scope of the invention.

What we claim is:

1. A communication instrument including a pair of barrels connected to swing about a common axis for interpupillary adjustment toward and from each other; a pair of eyepieces, one eyepiece being carried by each of said barrels; an optical arrangement operatively positioned in each of said barrels, said optical arrangement of each barrel including an objective lens means and image erecting prism means, said optical arrangement of at least one of said barrels additionally including a filter means, said filter means being adapted to reflect an infrared signal and pass a visual signal; one of said barrels defining a receiver means, the other of said barrels defining a transmitter means; means operatively connected to said instrument for supplying power to said receiver means and to said transmitter means; said transmitter means including an infrared emitter means and means for modulating a signal generated by said emitter means; said receiver means including an infrared detector means and means for amplifying a detected signal, said detector means being adapted to receive said infrared signal from said filter means.

2. The communication instrument defined in claim 1, wherein said filter means is of the dichroic type and is located intermediate said objective lens means and said image erecting prism means, and wherein said optical arrangement of said at least one of said barrels additionally includes a concave mirror means, said mirror means being adapted to fold an infrared beam back and shorten the effective focal length of the infrared portion of the optical arrangement.

3. The communication instrument defined in claim 2, wherein the plane of said filter means is located at about a 45° angle relative to the optical axis between said objective lens means and said eyepiece.

4. The communication instrument defined in claim 1, wherein said transmitter means additionally includes an electroacoustic transducer means operatively connected via a flexible conductor means.

5. The communication instrument defined in claim 1, wherein said receiver means additionally includes an electroacoustic transducer means operatively connected via a flexible conductor means.

6. The communication instrument defined in claim 1, additionally including a push-to-talk-and-listen button operatively connected to said transmitter and receiver means.

7. The communication instrument defined in claim 1, additionally including a gain adjustment means operatively connected to said transmitter and receiver means.

8. The communication instrument defined in claim 1, wherein said modulating means includes an electroacoustic transducer, a preamplifier, and a modulator.

9. The communication instrument defined in claim 1, wherein said amplifying means includes a pre-amplifier, an amplifier, a driver, and an electroacoustic transducer.

10. The communication instrument defined in claim 1 in combination with a similar instrument visually aimed at one another thereby defining a line-of-sight communication system which provides two way visual and voice communication via a modulated narrow infrared beam which is relatively secure from outside pickup and interference.

References Cited by the Examiner

UNITED STATES PATENTS

| | | | |
|---|---|---|---|
| 2,101,785 | 12/1937 | Wilckens. | |
| 2,153,709 | 4/1939 | Bournisien | 250—199 |
| 2,494,645 | 1/1960 | Collins | 250—199 |
| 3,111,587 | 11/1963 | Rocard | 250—199 |
| 3,164,725 | 1/1965 | Straub | 250—216 |

OTHER REFERENCES

Gifford, Radio, November 1943, pp. 32–34 and 72.

DAVID G. REDINBAUGH, *Primary Examiner.*

J. W. CALDWELL, *Assistant Examiner.*